Dec. 3, 1940.    J. GATZWEILER    2,224,076
APPARATUS FOR THE EVAPORATION OF LIQUID DAIRY PRODUCTS
Filed Oct. 7, 1938

Inventor
Josef Gatzweiler
per
Attorney

Patented Dec. 3, 1940

2,224,076

UNITED STATES PATENT OFFICE 2,224,076

APPARATUS FOR THE EVAPORATION OF LIQUID DAIRY PRODUCTS

Josef Gatzweiler, Aachen, Germany

Application October 7, 1938, Serial No. 233,879
In Germany April 12, 1937

2 Claims. (Cl. 159—16)

This invention relates to an apparatus for the evaporation of liquid dairy products such as milk, skim-milk, butter-milk, whey or the like.

Among other advantages the invention has those of enabling the evaporation or concentration of liquid dairy products at comparatively low costs, with high efficiency, with simple apparatus, and with relatively less expenditure of heat.

A further object of the invention is to obtain new products from liquid dairy products hitherto not known.

Figure 1:
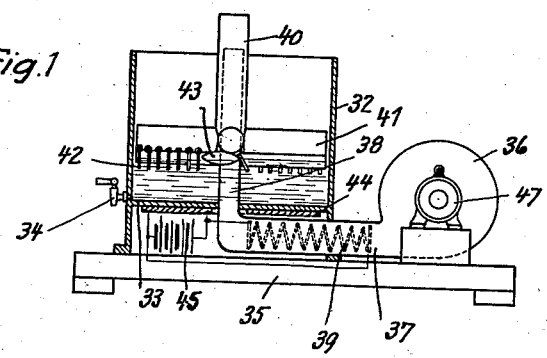
Figure 2:
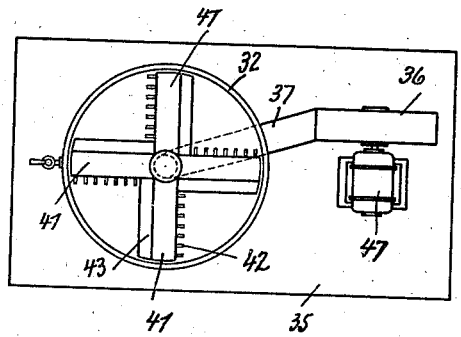

Embodiments of an apparatus adapted to be used for carrying out the process according to the invention are illustrated in the accompanying drawing in which Figure 1 is a view in elevation partly in section of the apparatus;

Figure 2 is a plan view of the same.

With the process according to the invention solidified milk may be produced from milk in a novel way.

With the process according to the invention skim-milk or butter-milk may be concentrated in a novel way to a portion of its volume and thereby a new product is obtained, which is especially adapted to be used as food for calves or the like, poultry, a. s. o.

Furthermore, with the process according to the invention new products may be obtained by concentrating whey up to a portion of its natural volume and such products may be used instead of skim-milk and they are especially adapted as a food for calves or the like.

In the embodiment of the apparatus shown in Figs. 1 and 2 32 denotes the tank containing the liquid dairy products, 33 the bottom of this tank, 44 an electric heating plate and 34 a draincock. The tank 32 is mounted on a support 35. A blower 36 driven by a motor 47 is also mounted on this support 35. The blower 36 is connected by a pipe 37 to a vertical pipe 38, mounted in the bottom of the tank 32, said pipe 38 extending up to the upper end of the tank 32. An electric heating spiral 39 is mounted in the pipe 37. Rotatably mounted concentrically on the upper end of the vertical pipe 38 is a pipe 40 closed at the upper end and lower end. The wall of said pipe 40 is spaced from the wall of the pipe 38. Horizontal hollow arms 41 are connected to the lower end of the pipe 40 said arms 41 having nozzles 42 being directed downwardly in an oblique direction. Furthermore, floats 43 floating on the liquid in the tank 32 are also fastened to the lower end of the pipe 40. The gas under pressure flows from the blower 36 through the pipes 37, 38, 40, arms 41 and nozzles 42 into the liquid. By the reaction of the gas under pressure flowing out from the nozzles 42 the pipe 40, the arms 41 and the floats 43 are rotated, thereby dividing the froth produced on the surface of the liquid. The heating plate 44 and the heating spiral 39 are connected to a source of electric current 45.

What I claim as new and desire to secure by Letters Patent of the United States is:

1. Apparatus of the class described comprising a tank adapted to contain the liquid products, a vertical pipe for supplying gas under pressure extending through the bottom of the tank beyond the surface of the liquid contents and being open at the upper end, a pipe closed at its upper end being concentrically and rotatably mounted on said vertical pipe and having radial hollow arms provided with small pipes immersing in the liquid at an angle to the vertical plane, said rotatable pipe and arms being supported by floats floating on the liquid contents and means for heating the liquid dairy products.

2. Apparatus of the class described, comprising a tank adapted to contain the liquid products, a vertical pipe for supplying gas under pressure extending through the bottom of the tank beyond the surface of the liquid contents and being open at the upper end, a pipe closed at its upper end being concentrically mounted on said vertical pipe and having radial hollow arms provided with small pipes immersing in the liquid, said pipe and arms being supported by floats floating on the liquid contents, and means for heating the liquid products.

JOS. GATZWEILER.